United States Patent
Courville et al.

(10) Patent No.: US 7,372,576 B2
(45) Date of Patent: *May 13, 2008

(54) SYSTEM AND METHOD FOR GENERATING BEAMS OF LIGHT USING AN ANISOTROPIC ACOUSTO-OPTIC MODULATOR

(75) Inventors: Carol J. Courville, San Jose, CA (US); Miao Zhu, San Jose, CA (US); Kerry D. Bagwell, Campbell, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/264,205

(22) Filed: Nov. 1, 2005

(65) Prior Publication Data

US 2007/0097377 A1    May 3, 2007

(51) Int. Cl.
   *G01B 9/02* (2006.01)
(52) U.S. Cl. ..................... 356/487; 359/311
(58) Field of Classification Search ........ 356/484–490; 359/305, 311
   See application file for complete search history.

(56) References Cited

U.S. PATENT DOCUMENTS

| | | | |
|---|---|---|---|
| 4,684,828 A | 8/1987 | Sommargren | |
| 4,902,888 A * | 2/1990 | Kondo | 250/227.27 |
| 5,359,451 A * | 10/1994 | Gelbart et al. | 359/285 |
| 5,485,272 A | 1/1996 | Dirksen et al. | |
| 5,970,077 A | 10/1999 | Hill | |
| 6,157,660 A | 12/2000 | Hill | |
| 6,452,682 B2 * | 9/2002 | Hill et al. | 356/487 |
| 6,806,960 B2 | 10/2004 | Bagwell et al. | |
| 2003/0035111 A1 * | 2/2003 | Nevis | 356/484 |
| 2004/0227943 A1 | 11/2004 | Law et al. | |
| 2005/0008322 A1 | 1/2005 | Sullivan et al. | |
| 2007/0097376 A1 * | 5/2007 | Courville et al. | 356/487 |

FOREIGN PATENT DOCUMENTS

RU    1800259 A1 *  3/1993

OTHER PUBLICATIONS

ISOMET homepage http://www.isomet.com; 2 pgs. Nov. 2005.

* cited by examiner

Primary Examiner—Samuel A. Turner

(57) ABSTRACT

A light source system includes a beam source generating a first input beam of light with first and second beam components. The first component has a first linear polarization and a first frequency. The second component has a second linear polarization and a second frequency. The first and second linear polarizations are orthogonal. An anisotropic acousto-optic modulator (AOM) is positioned to receive the first input beam. The AOM is operable to change the polarization and frequency of the first and the second beam components in response to a control signal, and thereby generate first and second output beams corresponding to the first and second components, respectively.

40 Claims, 5 Drawing Sheets

SYSTEM AND METHOD FOR GENERATING BEAMS OF LIGHT USING AN ANISOTROPIC ACOUSTO-OPTIC MODULATOR

BACKGROUND

Measurement optics in a polarization-based or multiplexed heterodyne interferometer such as used for precision measurements in semiconductor device manufacturing equipment generally use a light beam including orthogonal polarization components that have different frequencies. In heterodyne interferometry, a dual frequency/dual polarization source of light is used. The frequency difference between the two orthogonally polarized beam components is important because it can be the limit to how fast something can move and the distance still be measured accurately by this type of measurement system. Zeeman split HeNe lasers can provide orthogonally polarized light components, but the difference frequency is limited to a maximum of about 8 MHz. A two-mode frequency stabilized HeNe laser can also provide two orthogonally polarized beams with frequency separation, but this frequency difference is in the 500-1500 MHz range and cannot be easily utilized by the processing electronics. The desired frequency range that will fulfill the lithography industries need for speed, but is compatible with current electronic technology is about 7-30 MHz.

Several methods of producing a desired frequency split in a heterodyne interferometer have been used in the past. Most of these prior solutions involve conditioning the light to get the desired frequency after the stabilized laser source. One prior solution is to use two high frequency acousto-optic modulators (AOMs) to generate the desired difference frequency. The laser source beam is split into two beams of orthogonal polarization. Each linearly polarized beam is sent through an AOM. The first order diffracted beams from each AOM are redirected using mirrors and recombined using a second beam splitter to become collinear and co-bore again. While the absolute frequency of the AOMs in this prior solution is typically too high to be ideal (e.g., 80 MHz) the difference in frequency between the two different AOMs can be adjusted (e.g., one at 80 MHz and the other at 90 MHz) so that when the two orthogonal, linearly polarized beam components are recombined, they have the desired difference frequency. Unfortunately, this is a more costly solution, because two AOMs are used to achieve the desired results (along with a beam splitter, two turning mirrors and a second beam splitter which acts as a beam recombiner). Other solutions using two AOMs exist, but all have the disadvantage of multiple components (e.g., minimum of two AOM units and a beam splitter), which tends to increase the cost of the solutions.

Another prior approach is to use a single low frequency isotropic AOM with a single acoustic wave and a birefringent recombination prism. While this method reduces the number of components as compared to the previously described two-AOM solution, it has significant issues of its own. The major disadvantages include: a significant portion of the source light is discarded, (even with a single polarization output laser); the solution takes a lot of space to accomplish; and the solution does not fully accomplish a secondary benefit of AOM frequency shifters in providing isolation for the laser because it only isolates feedback on one polarization. In this prior method, only a single polarization and frequency are desired prior to the AOM device, so for a Zeeman split HeNe laser, a polarizer is typically used to filter out the other polarization/frequency component from the source laser. Thus, half the source light is eliminated before the beam enters the AOM.

In the isotropic acoustic wave interaction of this prior solution, there is no effect on the beam's polarization, so the diffracted (first order), frequency shifted beam is the same polarization as the zero order or un-diffracted beam. Exiting the AOM, the zero order and first order beams have a frequency difference of around 20 MHz in a current device on the market. The job of making the beams collinear again is accomplished by passing the beams through a birefringent recombination prism. The beam separation angle exiting this type of AOM is small, so no compensation is made for making the beams co-bore again after they are made parallel with the recombination prism. Typically, the optic axis of the recombination prism is at a forty-five degree angle to the polarization of the beams. The recombination prism splits each beam into two orthogonally polarized components. One component sees the index of refraction of $n_e$ and the other component sees the index of refraction of $n_o$. The two beams refract differently at the entrance and exit prism/air interfaces due to this index difference. The apex angle of the prism is optimized to allow one polarization component of each beam to become parallel again. The other two unwanted polarized beams exiting the recombination prism are not parallel to the desired beams and are apertured. This recombination scheme effectively throws away half the optical power in the first and zero order beams. The net result is that three-fourths of the original source optical power for a Zeeman split laser (more if the AOM device operates in the Raman Nath regime) is lost using this prior single isotropic AOM method of increasing the frequency split.

It is desirable to have a small footprint or package for a heterodyne interferometry light source, as this light source is often installed in a customer's equipment. The single low-frequency isotropic AOM solution has issues that demand more space than desired. To get adequate efficiency for a low frequency isotropic AOM, a long interaction length is necessary, so the device itself is quite long. Also, the separation angle between the diffracted orders on this device is small, so a long distance is typically used to get adequate beam separation to aperture off the unwanted beams following the recombination prism. Thus, a long footprint, additional optics to focus the light to a pinhole spatial filter, or additional optics to fold the beam path in the package may be used to address this issue.

In addition, when using a single low frequency isotropic AOM with zero and first order beams, the zero order beam does not protect the laser from feedback because the frequency in that path is still the laser frequency (not shifted up or down). Reflections from this beam upstream that make it back to the laser will cause wavelength stability problems and a possible loss of lock for the laser.

In another prior approach, two shifted frequency beams are generated in the same isotropic AOM. The frequency shifts for both beams are accomplished in a couple of different ways. The first is to use one acoustic wave in the AOM. There is a polarizing beam splitter before (or attached to the AOM) to split a single frequency polarized beam into two orthogonally polarized beams. The polarizing beam splitter also does the task of orienting the two orthogonally polarized beams at the plus and minus Bragg angle of the AOM device so that one beam is up-shifted and one beam is down-shifted by the single acoustic wave frequency. The AOM itself is isotropic and does not affect the polarization of the beams. The frequency difference between the output beams is two times the AOM frequency. In another form of the single isotropic AOM solution, a longer crystal is used, and each polarized beam traverses through two acoustic waves in series, which are generated by two transducers of the AOM. The net result on the output beams is a frequency difference of two times the difference in frequency of the two AOM transducers. Again, this is an isotropic interaction (i.e., it does not affect polarization), and a beam splitter is used before the AOM device to generate two beams of orthogonal polarization and moving in diverging directions.

DETAILED DESCRIPTION

In the following Detailed Description, reference is made to the accompanying drawings, which form a part hereof, and in which is shown specific and illustrative embodiments according to the present teachings. It is to be understood that other embodiments may be utilized and structural or logical changes may be made without departing from the scope of the appended claims. The following Detailed Description, therefore, is not to be taken in a limiting sense, and the scope of the present invention is defined by the appended claims.

Figure 1:
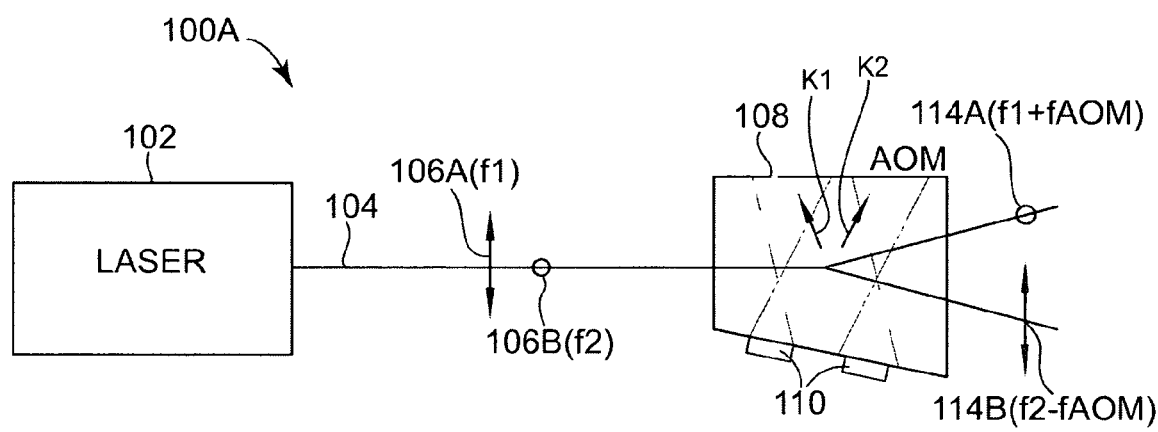
FIG. 1 is diagram illustrating a system for producing frequency-shifted beams with orthogonal linear polarizations in a first embodiment according to the present teachings.

FIG. 1 is diagram illustrating a system 100A for producing frequency-shifted beams with orthogonal linear polarizations in a first embodiment according to the present teachings. System 100A includes laser light source (laser) 102 and acousto-optic modulator (AOM) 108. Laser 102 acts as a source of a heterodyne beam 104 having two distinct frequency components (f1 and f2) with orthogonal linear polarizations (e.g., horizontal and vertical). A beam or beam component with a vertical polarization, such as beam component 106A, is represented in the Figures by an upward and downward pointing arrow, and a beam or beam component with a horizontal polarization, such as beam component 106B, is represented by a circle. An exemplary embodiment of laser 102 is a commercially available He—Ne laser such as a Model 5517B available from Agilent Technologies, Inc., which uses Zeeman splitting to generate the two frequency components in the same laser cavity. Zeeman splitting in this manner can generate a laser beam having frequency components with frequencies f1 and f2 and a frequency difference (f2−f1) of about 2 MHz. The two frequency components f1 and f2 have opposite circular polarizations, and a quarter-wave plate is used to change the polarizations of the frequency components so that the two frequency components have orthogonal linear polarizations. In another specific embodiment, laser 102 is a two-mode frequency stabilized laser. A Zeeman laser has better frequency stability than a laser using the two-mode frequency stabilization method.

In the illustrated embodiment, AOM 108 is an anisotropic, low frequency shear wave AOM with a $TeO_2$ uniaxial crystal. One example of an AOM device that is suitable for use in implementing AOM 108 is the FS1102 AOM produced by Isomet Corporation (www.isomet.com), having headquarters located at 5263 Port Royal Road, Springfield, Va. 22151. AOM 108 includes electro-acoustic transducers 110 for receiving control signals. The electro-acoustic transducers 110 convert electrical signals into sound waves that are launched through the crystal of the AOM 108. The transducers 110 excite the AOM 108 with two acoustic waves of the same or different frequencies, and with a small angle between their propagation directions (i.e., the two waves have different propagation vectors, which are identified in FIG. 1 by K1 and K2). Two acoustic waves or beams are used so that correct phase matching can exist for both input beam components 106A and 106B. A first one of the acoustic waves acts on the horizontal polarization 106B of the orthogonally polarized laser source beam 104, and a second one of the acoustic waves is phase matched to the vertical polarization 106A of the source beam 104.

For a laser beam 104 with a given propagation direction in the crystal of the AOM 108, the laser field can be decomposed into two components according to the polarization. One of the components is call the ordinary wave while the other is called the extraordinary wave. The propagation speed of the ordinary wave is different from the propagation speed of the extraordinary wave. If there is no acoustic field in the crystal of the AOM 108, the ordinary wave and the extraordinary wave preserve their propagation directions as well as their polarizations. The propagation directions of the laser beam 104 and the acoustic fields in the crystal of the AOM 108 are chosen so that the extraordinary wave in the input laser beam 104 is phase matched to be down-converted (diffracted) into the ordinary wave by one of the acoustic fields. Simultaneously, the ordinary wave in the input laser beam 104 is phase matched to be up-converted (diffracted) into the extraordinary wave by the other acoustic field.

AOM 108 is operated in a low-frequency shear mode. AOM 108 diffracts the two input beam components 106A and 106B in opposite directions, thereby producing plus first order beam 114A, which corresponds to component 106A, and minus first order beam 114B, which corresponds to component 106B. AOM 108 causes an increase in the frequency of component 106A, a decrease in the frequency of component 106B, and causes a ninety-degree rotation in the polarization of both components 106A and 106B. The net effect is that while both input beam components 106A and 106B change polarization (i.e., horizontal becomes vertical and vertical becomes horizontal), the beams stay orthogonally polarized, and now have a frequency difference given by the following Equation I:

$$f_{split} = (f1 + f_{aomtransducer1}) - (f2 - f_{aomtransducer2}) \quad \text{Equation I}$$

where:
  $f_{split}$=difference in the frequency of beam 114A and the frequency of beam 114B;

f1=frequency of beam component 106A;
f2=frequency of beam component 106B;
faomtransducer1=frequency of first signal provided to transducers 110; and
faomtransducer2=frequency of second signal provided to transducers 110.

In a specific embodiment according to the present teachings, faomtransducer1 and faomtransducer2 are both in the range of about 10 to 450 MHz. In the embodiment shown in FIG. 1, faomtransducer1 is the same as faomtransducer2, and this common frequency is identified in FIG. 1 by the term "fAOM".

As an example, if the transducers 110 are provided with a 10 MHz RF control signal, both output beams 114A and 114B will be frequency shifted by 10 MHz, but in opposite directions (i.e., plus 10 MHz and minus 10 MHz), for a frequency split or difference of 20 MHz caused by the AOM 108. If the Zeeman laser light source 102 provides a 2 MHz split (i.e., |f2−f1|=2 MHz), system 100A provides a total frequency split (fsplit) in beams 114A and 114B of 18 MHz or 22 MHz. In a specific embodiment according to the present teachings, the total frequency split (fsplit) in beams 114A and 114B is in the range of 8 to 30 MHz.

Using an anisotropic AOM 108 is optimal for a Zeeman split laser 102, which already has two orthogonal polarizations and frequencies. In the embodiment shown in FIG. 1, a single, low frequency, anisotropic AOM 108 is used to increase the frequency difference, |f1−f2|, between input beam component 106A and input beam component 106B. The same embodiment can also be used, with the proper frequency applied to AOM 108, to decrease the frequency difference, |f1−f2|, between input beam component 106A and input beam component 106B. In a specific embodiment according to the present teachings, beams 114A and 114B have a combined optical power that is substantially the same as the optical power of beam 104.

Figure 2:
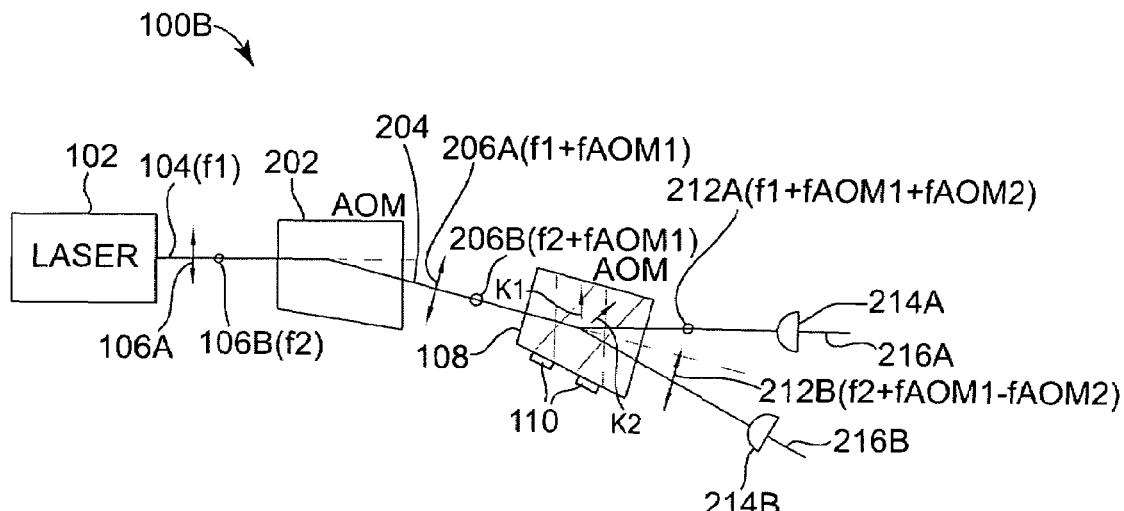
FIG. 2 is a diagram illustrating a system for producing frequency-shifted beams with orthogonal linear polarizations in a second embodiment according to the present teachings.

FIG. 2 is a diagram illustrating a system 100B for producing frequency-shifted beams with orthogonal linear polarizations in a second embodiment according to the present teachings. In the illustrated embodiment, system 100B includes the same laser light source (laser) 102 and acousto-optic modulator (AOM) 108 as system 100A (FIG. 1), and the laser 102 and AOM 108 shown in FIG. 2 operate in the same manner as described above with respect to FIG. 1. One difference between system 100B and system 100A is that system 100B also includes a second AOM 202, which is positioned between the laser 102 and AOM 108. AOM 202 is a high-frequency isotropic AOM that up-shifts or down-shifts the frequency of both components 106A and 106B of the beam 104 by the same amount (e.g., 30-500 MHz).

As described above with respect to FIG. 1, AOM 108 up shifts the frequency (f1) of the first component 106A of beam 104, and down shifts the frequency (f2) of the second component 106B of beam 104. In some applications, the frequency shifts provided by AOM 108 may not be sufficient to isolate the laser 102 from optical feedback. To provide additional isolation, AOM 202 is added between laser 102 and AOM 108. AOM 202 is an isotropic high-frequency AOM that is used to up shift the frequency of both components 106A and 106B of the beam 104 by the same relatively large amount (e.g., 80 MHz) to provide better optical isolation. Since AOM 202 is isotropic, the polarizations of the orthogonal beam components 106A and 106B are not affected by AOM 202. In a specific embodiment according to the present teachings, AOM 108 and AOM 202 are pre-aligned in a single package.

AOM 202 generates an output beam 204 with up-shifted frequency components (f1+fAOM1 and f2+fAOM1), where fAOM1 represents the signal frequency applied to AOM 202 (e.g., 80 MHz). The first up-shifted frequency component 206A (f1+fAOM1) has a vertical linear polarization, and the second up-shifted frequency component 206B (f2+fAOM1) has a horizontal linear polarization. The output beam 204 from AOM 202 is provided as an input beam to AOM 108.

In the embodiment shown in FIG. 2, faomtransducer1 (Equation I) is the same as faomtransducer2 (Equation I), and this common frequency is identified in FIG. 2 by the term "fAOM2". AOM 108 up-shifts the frequency of the first component 206A (f1+fAOM1) of beam 204 by an amount fAOM2, and changes the polarization of the first component from vertical to horizontal, resulting in a horizontally polarized beam 212A that has a frequency of f1+fAOM1+fAOM2. Similarly, AOM 108 down-shifts the frequency of the second component 206B (f2+fAOM1) of beam 204 by an amount fAOM2, and changes the polarization of the second component from horizontal to vertical, resulting in a vertically polarized beam 212B that has a frequency of f2+fAOM1−fAOM2.

In the embodiment shown in FIG. 2, beam 212A is coupled into optical fiber 216A by lens 214A, and beam 212B is coupled into optical fiber 216B by lens 214B. Optical fibers 216A and 216B carry beams 212A and 212B downstream to a beam-combining unit that combines the beams 212A and 212B into a combined beam for use in interferometer optics at a measurement site. In a specific embodiment according to the present teachings, fibers 216A and 216B are polarization-maintaining (PM) fibers.

The use of fibers 216A and 216B allows the laser 102 and AOMs 108 and 202 to be positioned remotely from the interferometer optics so that the laser 102 and the AOMs 108 and 202 do not affect the thermal environment of the interferometer optics. Sending the separate beams 212A and 212B on corresponding separate fibers 216A and 216B avoids cross-talk between the polarization components. The use of fibers 216A and 216B to deliver the light downstream provides several other advantages, including: (1) compensation for pointing stability issues caused by ambient temperature variations is not necessary when the light is delivered with an optical fiber; (2) there is no need for additional optics to make the beams 216A and 216B co-bore, and the co-linearity specification is much looser; and (3) fiber delivery combined with the increased split frequency provided by system 100B reduces or eliminates the need for electronics at the downstream metrology stage area that might generate heat.

In the embodiment shown in FIG. 2, AOM 202 is an isotropic AOM. In another embodiment, AOM 202 is an anisotropic AOM that changes the polarization of both beam components 106A and 106B.

In the embodiment shown in FIG. 2, AOM 202 is positioned between the laser 102 and AOM 108. In another embodiment, AOM 202 is positioned between AOM 108 and the lenses 214A and 214B.

Figure 3:
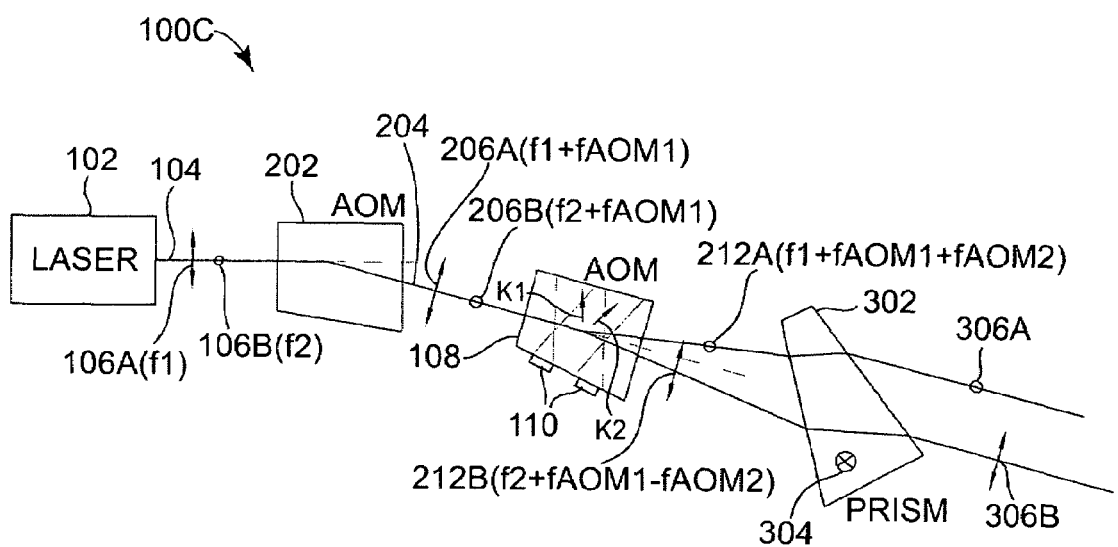
FIG. 3 is a diagram illustrating a system for producing frequency-shifted beams with orthogonal linear polarizations in a third embodiment according to the present teachings.

FIG. 3 is a diagram illustrating a system 100C for producing frequency-shifted beams with orthogonal linear polarizations in a third embodiment according to the present teachings. In the illustrated embodiment, system 100C includes the same laser light source (laser) 102 and acousto-optic modulators (AOMs) 108 and 202 as system 100B (FIG. 2), and the laser 102 and AOMs 108 and 202 shown in FIG. 3 operate in the same manner as described above with respect to FIG. 2. One difference between system 100C and system 100B is that system 100C includes birefringent recombination prism or wedge 302 rather than the lenses 214A and 214B, and the optical fibers 216A and 216B shown in FIG. 2.

The anisotropic AOM 108 has a larger diffraction angle than the previous solutions that use a single isotropic AOM, so the co-bore (in addition to the co-linearity) of the output beams 212A and 212B should be addressed if fiber delivery is not used. In the embodiment shown in FIG. 3, the co-linearity angles are adjusted with birefringent recombination prism 302. Prism 302 receives beams 212A and 212B from AOM 108, and re-directs these beams 212A and 212B to produce corresponding parallel beams 306A and 306B. The optic axis of the prism 302 is identified at 304 in FIG. 3. The two beams 212A and 212B refract differently at the entrance and exit prism/air interfaces, and the prism 302 is appropriately positioned to cause the input beams 212A and 212B to become corresponding parallel beams 306A and 306B. The beams 212A and 212B exiting the AOM 108 are orthogonally polarized, so very little light is lost in the recombination prism 302.

Figure 4:
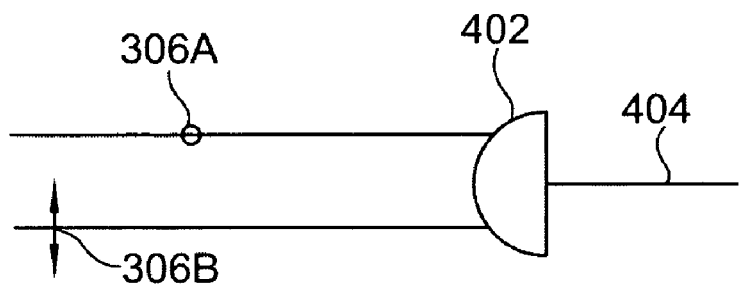
FIG. 4 is a diagram illustrating the combining of beams in a first embodiment according to the present teachings.

FIG. 4 is a diagram illustrating the combining of parallel beams in a first embodiment according to the present teachings. As shown in FIG. 4, the parallel beams 306A and 306B produced by prism 302 (FIG. 3) are provided to lens 402. Lens 402 combines beams 306A and 306B, thereby producing a combined beam that is directed into a polarization maintaining optical fiber 404. Optical fiber 404 carries the combined beam downstream to interferometer optics at a measurement site.

Figure 5:
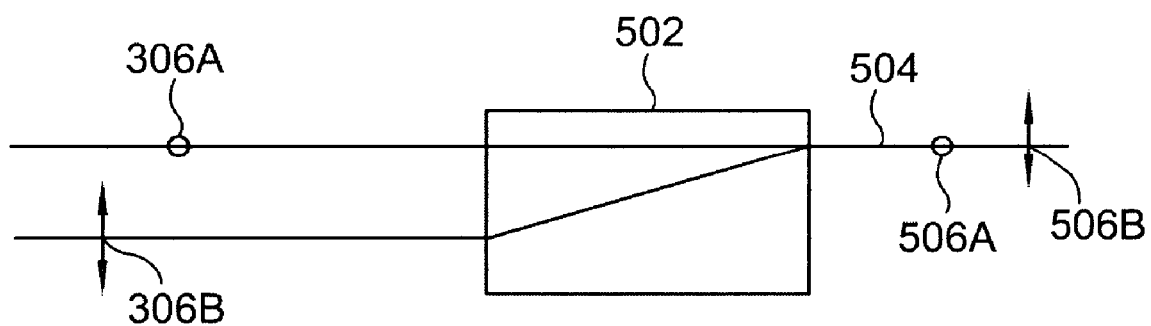
FIG. 5 is a diagram illustrating the combining of beams in a second embodiment according to the present teachings.

FIG. 5 is a diagram illustrating the combining of parallel beams in a second embodiment according to the present teachings. As shown in FIG. 5, the parallel beams 306A and 306B produced by prism 302 (FIG. 3) are provided to walk off prism 502. Walk off prism 502 "walks" beams 306A and 306B back together so that they are co-bore, thereby producing combined beam 504. Combined beam 504 has one component 506A with a horizontal polarization, and another component 506B with a vertical polarization. The combined beam 504 is provided to interferometer optics at a measurement site. Adjusting the tilt of the prism 302 can compensate for any errors in co-linearity caused by an imperfect walk off prism.

Figure 6:
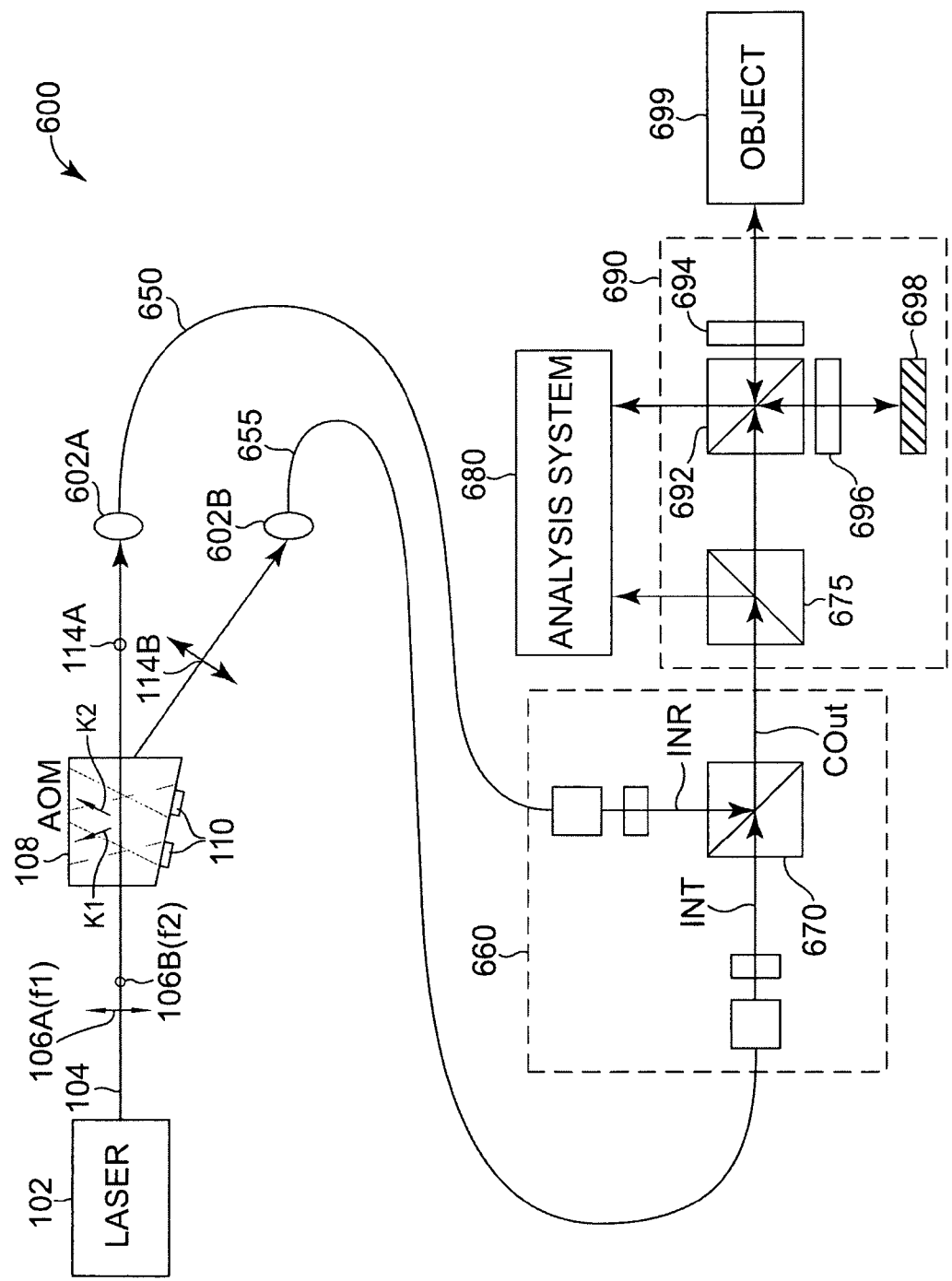
FIG. 6 is a block diagram illustrating an interferometer system in one embodiment according to the present teachings.

FIG. 6 is a block diagram illustrating a two-frequency interferometer system 600 in one embodiment according to the present teachings. Interferometer 600 includes laser light source 102, AOM 108, lenses 602A and 602B, optical fibers 650 and 655, beam-combining unit 660, analysis system 680, and interferometer optics 690. Laser 102 and AOM 108 operate as described above with respect to FIG. 1 to produce linearly-orthogonally polarized beams 114A and 114B. Laser 102 uses Zeeman splitting to generate a heterodyne beam 104, and anisotropic AOM 108 flips the polarization of the two beam components 106A and 106B, and increases the frequency difference between the two beam components 106A and 106B, and thereby produces linearly-orthogonally polarized beams 114A and 114B. In another embodiment, system 600 is configured as a free-beam system, rather than using fiber delivery as shown in FIG. 6. In yet another embodiment, system 600 includes a second AOM 202 positioned between the laser 102 and anisotropic AOM 108 or after AOM 108, as shown in FIGS. 2 and 3 and described above.

In the embodiment shown in FIG. 6, lenses 602A and 602B focus the beams 114A and 114B into separate polarization-maintaining optical fibers 650 and 655, respectively. Polarization-maintaining fibers 650 and 655 deliver the beams 114A and 114B to beam-combining unit 660, which directs the two beams into a beam combiner 670.

The use of optical fibers 650 and 655 allows laser 102 and AOM 108 to be mounted away from interferometer optics 690. Accordingly, heat generated in laser 102 and AOM 108 does not disturb the thermal environment of interferometer optics 690. Additionally, laser 102 and AOM 108 do not need to have fixed positions relative to interferometer optics 690, which may provide significant advantages in applications having limited available space near the object 699 being measured.

Beam-combining unit 660 precisely aligns input beam 114A (INR) and input beam 114B (INT) from optical fibers 650 and 655 for combination in beam combiner 670 to form a collinear output beam COut. Beam combiner 670 can be a coated polarizing beam splitter that is used in reverse. Combined beam COut is input to interferometer optics 690. In interferometer optics 690, a beam splitter 675 reflects a portion of beam COut to analysis system 680, and analysis system 680 uses the two frequency components of the light reflected in beam splitter 675 as first and second reference beams. The remaining portion of combined beam COut can be expanded in size by a beam expander (not shown) before entering a polarizing beam splitter 692.

Polarizing beam splitter 692 reflects one of the polarizations (i.e., one frequency beam) to form a third reference beam directed through optics 696 toward a reference reflector 698 and transmits the other linear polarization (i.e., the other frequency) as a measurement beam through optics 694 toward an object 699 being measured. In an alternative version of the interferometer optics 690, a polarizing beam splitter transmits the component that forms the measurement beam and reflects the component that forms the reference beam.

Movement of the object 699 being measured causes a phase change in the measurement beam that analysis system 680 measures by combining the measurement beam with the third reference beam to form a beat signal. To accurately determine the phase change caused by the movement of the object 699, the phase of this beat signal can be compared to the phase of a reference beat signal generated from a combination of the first and second reference beams. Analysis system 680 analyzes the phase change to determine the speed of and/or distance moved by the object 699.

Figure 7:
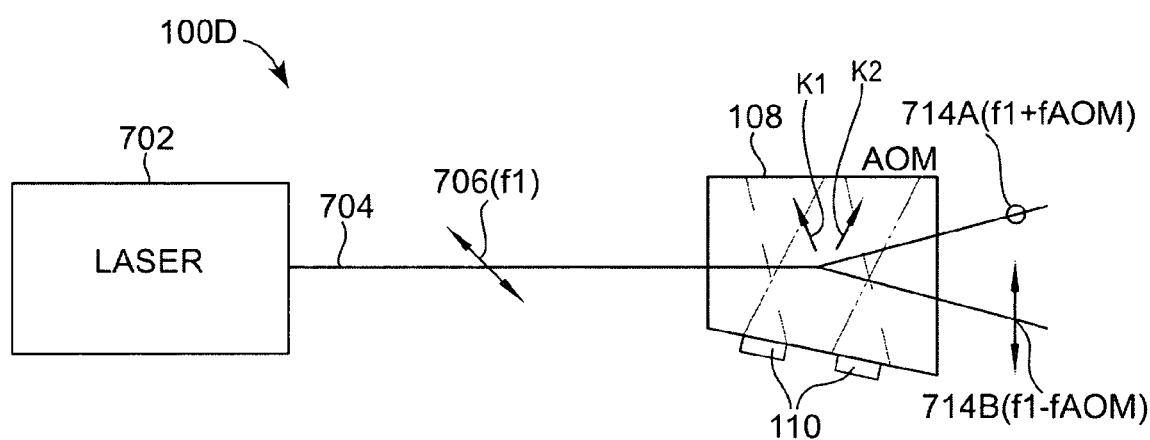
FIG. 7 is a diagram illustrating a system for producing frequency-shifted beams with orthogonal linear polarizations in a fourth embodiment according to the present teachings.

FIG. 7 is a diagram illustrating a system 100D for producing frequency-shifted beams with orthogonal linear polarizations in a fourth embodiment according to the present teachings. In the illustrated embodiment, system 100D includes the same acousto-optic modulator (AOM) 108 as systems 100A-100C, but system 100D uses a different laser 702 than the laser 102 of system 100A. In the embodiment shown in FIG. 7, laser 702 acts as a source of a beam 704 having a single frequency (f1) with a single linear polarization. The single linear polarization is a 45 degree polarization in the illustrated embodiment, which is represented in FIG. 7 by arrow 706.

AOM 108 acts as a polarizing beam splitter and splits the input beam 704 into a horizontally polarized beam component and a vertically polarized beam component. AOM 108 diffracts these two orthogonally polarized beam components in opposite directions, thereby producing plus first order beam 714A, and minus first order beam 714B. AOM 108 causes an increase in the frequency of one beam component, a decrease in the frequency of the other beam component, and causes a ninety-degree rotation in the polarization of both beam components. The net effect is that while both beam components change polarization (i.e., horizontal becomes vertical and vertical becomes horizontal), the beams stay orthogonally polarized, and now have a frequency difference given by the following Equation II:

$$fsplit = (f1 + faomtransducer1) - (f1 - faomtransducer2) \quad \text{Equation II}$$

where:
fsplit=difference in the frequency of beam 714A and the frequency of beam 714B;
f1=frequency of beam 704;
faomtransducer1=frequency of first signal provided to transducers 110; and
faomtransducer2=frequency of second signal provided to transducers 110.

In a specific embodiment according to the present teachings, faomtransducer1 and faomtransducer2 are both in the range of about 10 to 450 MHz. In the embodiment shown in FIG. 7, faomtransducer1 is the same as faomtransducer2, and this common frequency is identified in FIG. 7 by the term "fAOM".

As an example, if the transducers 110 are provided with a 10 MHz RF control signal, both output beams 714A and 714B will be frequency shifted by 10 MHz, but in opposite directions (i.e., plus 10 MHz and minus 10 MHz), for a frequency split or difference of 20 MHz caused by the AOM 108. In a specific embodiment according to the present teachings, the total frequency split (fsplit) in beams 714A and 714B is in the range of 8 to 30 MHz.

In another embodiment according to the present teachings, the input beam 704 has a polarization state other than 45 degrees. Regardless of what polarization state is chosen for beam 704, when the beam 704 enters the crystal of AOM 108, the polarization is decomposed into two orthogonal eigen polarizations. The optical power in each eigen polarization depends on the polarization state of the input beam 704. Linear polarization oriented at 45 degrees from the optical axis of the crystal of AOM 108 is used for beam 704 in one form of the invention because it results in two output beams 714A and 714B with equal optical power. In a specific embodiment according to the present teachings, beams 714A and 714B have a combined optical power that is substantially the same as the optical power of beam 704.

In another embodiment according to the present teachings, system 100D includes a second AOM 202 positioned between the laser 702 and anisotropic AOM 108 or after AOM 108, as shown in FIGS. 2 and 3 and described above. In a specific embodiment according to the present teachings, interferometer system 600 (FIG. 6) uses a single frequency, single polarization laser, such as laser 702, rather than the two frequency, two polarization laser 102 shown in FIG. 6.

Specific embodiments according to the present teachings provide several advantages over prior solutions. Specific embodiments according to the present teachings provide a significant optical power savings, can be implemented in less space, and have better optical isolation than prior solutions. In the anisotropic low frequency AOM device 108, the interaction length is shorter, and the beams exit the AOM 108 with a larger separation angle as compared with the prior solution of using a single isotropic AOM device. Both of these properties lead to a smaller, more compact package for the final product. The shorter interaction length means the AOM device 108 can be much smaller. The larger separation angle means that the unwanted beams can be apertured in a shorter distance. Both beams produced by AOM 108 are shifted in frequency, so AOM 108 is a better optical isolator for the laser 102 than the prior solution of using a single isotropic AOM.

Specific embodiments according to the present teachings are less complex than the prior solutions that use two high frequency AOMs, in that a polarization beam splitter is not used prior to the AOM device 108 to divide a single polarization beam into two orthogonally polarized beams and alter the direction of the beams. In addition, AOM 108 is further distinguishable over many prior solutions in that AOM 108 uses an anisotropic interaction, rather than the isotropic interaction used in these previous solutions.

In one prior approach, an anisotropic AOM is used with two acoustic frequencies in series to generate orthogonally polarized frequency shifted beams from a single polarization optical source. In contrast, specific embodiments according to the present teachings that use the dual acoustic wave AOM 108 do not generate two orthogonal polarizations from a single input polarization. Rather, the AOM 108 preserves the two polarizations of the laser 102 throughout the device 108, while up shifting one beam and downshifting the other beam.

In other specific embodiments according to the present teachings, AOM 108 is configured to generate orthogonally polarized frequency shifted beams from a single polarization optical source. Regardless of whether AOM 108 is used with a single polarization source, or a two polarization source, such as a Zeeman laser, the AOM 108 according to a specific embodiment preserves or maintains the optical power of the input beam that is provided to the AOM 108. Thus, in both of these cases, the output beams that exit the AOM 108 have a combined optical power that is substantially the same as the optical power of the input beam that enters the AOM 108.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A light source system comprising:
a beam source generating a first input beam of light with first and second beam components, the first component having a first linear polarization and a first frequency, the second component having a second linear polarization and a second frequency, wherein the first and second linear polarizations are orthogonal; and
an anisotropic acousto-optic modulator (AOM) positioned to receive the first input beam, wherein the AOM is operable to change the polarization and frequency of the first and the second beam components in response to a control signal, and thereby generate first and second output beams corresponding to the first and second components, respectively.

2. The light source system of claim 1, wherein the beam source comprises a laser.

3. The light source system of claim 2, wherein the laser comprises a Zeeman laser.

4. The light source system of claim 3, wherein the laser comprises a two-mode frequency stabilized laser.

5. The light source system of claim 1, wherein the first output beam has the second linear polarization, and wherein the second output beam has the first linear polarization.

6. The light source system of claim 1, and further comprising at least one optical fiber positioned to receive the first and the second output beams.

7. The light source system of claim 1, and further comprising a birefringent prism positioned to receive the first and the second output beams and make the first and the second output beams parallel.

8. The light source system of claim 7, and further comprising at least one optical fiber positioned to receive the parallel first and second output beams from the birefringent prism.

9. The light source system of claim 7, and further comprising a walk off prism configured to bring the parallel first and second output beams together into a combined beam.

10. The light source system of claim 1, and further comprising an isotropic acousto-optic modulator (AOM) positioned either to receive said input beam generated by said beam source before said input beam reaches said anisotropic AOM, or to receive said first and second output beams generated by said anisotropic AOM.

11. The light source system of claim 10, wherein the isotropic AOM is configured to change the frequency of the first and second beam components by a first amount.

12. The light source system of claim 11, wherein the first amount is in the range of about 30 to 500 MHz.

13. The light source system of claim 10, wherein the anisotropic AOM and the isotropic AOM are pre-aligned in a single package.

14. The A light source system comprising:
a beam source generating a first input beam of light with first and second beam components, the first component having a first linear polarization and a first frequency, the second component having a second linear polarization and a second frequency, wherein the first and second linear polarizations are orthogonal;
an anisotropic acousto-optic modulator (AOM) positioned to receive the first input beam, wherein the AOM is operable to change the polarization and frequency of the first and the second beam components in response to a control signal, and thereby generate first and second output beams corresponding to the first and second components, respectively; and
wherein the AOM is configured to increase the frequency of the first beam component by a first amount and decrease the frequency of the second beam component by a second amount.

15. The light source system of claim 14, wherein the first amount and the second amount are each in the range of about 10 to 450 MHz.

16. The light source system of claim 14, wherein the first amount and the second amount are the same.

17. A method of generating light beams, the method comprising:
providing an anisotropic acousto-optic modulator (AOM);
directing a first input beam into the AOM, the first input beam including first and second beam components, the first component having a first linear polarization and a first frequency, the second component having a second linear polarization and a second frequency, wherein the first and second linear polarizations are orthogonal; and
applying a control signal to the AOM, thereby causing the AOM to change the polarization and frequency of the first and the second beam components, and generate corresponding first and second output beams.

18. The method of claim 17, wherein the first input beam is generated by a laser.

19. The method of claim 18, wherein the laser comprises a Zeeman laser.

20. The method of claim 18, wherein the laser comprises a two-mode frequency stabilized laser.

21. The method of claim 17, wherein the first output beam has the second linear polarization, and wherein the second output beam has the first linear polarization.

22. The method of claim 17, and further comprising:
directing the first and the second output beams into at least one optical fiber.

23. The method of claim 17, and further comprising:
receiving the first and second output beams with a birefringent prism; and
making the first output beam parallel to the second output beam with the birefringent prism.

24. The method of claim 23, and further comprising:
directing the parallel first and second output beams into at least one optical fiber.

25. The method of claim 23, and further comprising:
bringing the parallel first and second output beams together into a combined beam.

26. The method of claim 17, and further comprising:
providing an isotropic acousto-optic modulator (AOM) positioned either to receive said input beam generated by said beam source before said input beam reaches said anisotropic AOM, or to receive said first and second output beams generated by said anisotropic AOM.

27. The method of claim 26, and further comprising:
applying a control signal to the isotropic AOM, thereby causing the isotropic AOM to increase the frequency of the first and second beam components by a first amount.

28. The method of claim 27, wherein the first is in the range of about 30 to 500 MHz.

29. The method of claim 26, wherein the anisotropic AOM and the isotropic AOM are implemented in a single package.

30. A method of generating light beams, the method comprising:
providing an anisotropic acousto-optic modulator (AOM);
directing a first input beam into the AOM, the first input beam including first and second beam components, the first component having a first linear polarization and a first frequency, the second component having a second linear polarization and a second frequency, wherein the first and second linear polarizations are orthogonal;
applying a control signal to the AOM, thereby causing the AOM to change the polarization and frequency of the first and the second beam components, and generate corresponding first and second output beams; and
wherein the control signal causes the AOM to increase the frequency of the first beam component by a first amount and decrease the frequency of the second beam component by a second amount.

31. The method of claim 30, wherein the first amount and the second amount are each in the range of about 10 to 450 MHz.

32. The method of claim 30, wherein the first amount and the second amount are substantially equal.

33. An interferometer system comprising:
a beam source generating a first input beam of light with first and second beam components, the first component having a first linear polarization and a first frequency, the second component having a second linear polarization and a second frequency, wherein the first and second linear polarizations are orthogonal;

an anisotropic acousto-optic modulator (AOM) positioned to receive the first input beam, wherein the AOM is responsive to a control signal to change the polarization and frequency of the first beam component, thereby generating a corresponding first output beam, and change the polarization and frequency of the second beam component, thereby generating a corresponding second output beam;

interferometer optics for generating a reference beam and a measurement beam based on the first and second output beams; and an analysis system for determining movement information based on the reference beam and the measurement beam.

34. The interferometer system of claim 33, wherein the beam source comprises a Zeeman laser.

35. The interferometer system of claim 33, wherein the beam source comprises a two-mode frequency stabilized laser.

36. The interferometer system of claim 33, wherein the first output beam has the second linear polarization, and wherein the second output beam has the first linear polarization.

37. The interferometer system of claim 33, and further comprising an isotropic acousto-optic modulator (AOM) configured to increase the frequency of the first and second beam components;

wherein said isotropic AOM is positioned either to receive said input beam generated by said beam source before said input beam reaches said anisotropic AOM, or to receive said first and second output beams generated by said anisotropic AOM.

38. The interferometer system of claim 37, wherein the anisotropic AOM and the isotropic AOM are implemented in a single package.

39. An interferometer system comprising:

a beam source generating a first input beam of light with first and second beam components, the first component having a first linear polarization and a first frequency, the second component having a second linear polarization and a second frequency, wherein the first and second linear polarizations are orthogonal;

an anisotropic acousto-optic modulator (AOM) positioned to receive the first input beam, wherein the AOM is responsive to a control signal to change the polarization and frequency of the first beam component, thereby generating a corresponding first output beam, and change the polarization and frequency of the second beam component, thereby generating a corresponding second output beam;

interferometer optics for generating a reference beam and a measurement beam based on the first and second output beams;

an analysis system for determining movement information based on the reference beam and the measurement beam; and wherein the AOM is configured to increase the frequency of the first beam component by a first amount and decrease the frequency of the second beam component by a second amount.

40. The interferometer system of claim 39, wherein the first amount and the second amount are equal.

* * * * *